United States Patent
Pickett et al.

(10) Patent No.: US 9,545,048 B2
(45) Date of Patent: Jan. 17, 2017

(54) SYSTEM FOR AUTOMATED UNLOADING OF AN AGRICULTURAL MATERIAL

(75) Inventors: Terence D. Pickett, Waukee, IA (US); Brandon M. McDonald, Johnston, IA (US)

(73) Assignee: DEERE & COMPANY, Moline, IL (US)

( * ) Notice: Subject to any disclaimer, the term of this patent is extended or adjusted under 35 U.S.C. 154(b) by 334 days.

(21) Appl. No.: 13/209,801

(22) Filed: Aug. 15, 2011

(65) Prior Publication Data

US 2013/0045067 A1  Feb. 21, 2013

(51) Int. Cl.
*A01B 69/04* (2006.01)
*G05D 1/02* (2006.01)

(52) U.S. Cl.
CPC .......... *A01B 69/008* (2013.01); *G05D 1/024* (2013.01); *G05D 1/0246* (2013.01); *G05D 1/0278* (2013.01); *G05D 2201/0201* (2013.01)

(58) Field of Classification Search
CPC .............................. A01B 69/008; G05D 1/024
See application file for complete search history.

(56) References Cited

U.S. PATENT DOCUMENTS

| | | | |
|---|---|---|---|
| 4,376,609 A | 3/1983 | Bohman et al. | |
| 5,357,432 A * | 10/1994 | Margolis et al. | 701/23 |
| 5,575,316 A | 11/1996 | Pollklas | |
| 5,749,783 A * | 5/1998 | Pollklas | 460/119 |
| 6,216,071 B1 | 4/2001 | Motz | |
| 6,309,164 B1 * | 10/2001 | Holder et al. | 414/399 |
| 6,691,135 B2 | 2/2004 | Pickett et al. | |
| 6,697,724 B2 | 2/2004 | Beck | |
| 6,931,772 B2 | 8/2005 | Furuno et al. | |

(Continued)

FOREIGN PATENT DOCUMENTS

| | | |
|---|---|---|
| EP | 2044826 | 4/2009 |
| EP | 2138027 | 12/2009 |

(Continued)

OTHER PUBLICATIONS

International Search Report and the Written Opinion of the International Searching Authority, or the Declaration, dated Oct. 26, 2012 (8 pages).

*Primary Examiner* — Basil T Jos

(57) ABSTRACT

A system for managing the transfer of agricultural material from a material-transferring vehicle to a material-receiving vehicle. An unloading chute is adapted to transfer material from a first storage container of the material-transferring vehicle to a material-receiving vehicle alongside the material-transferring vehicle. A location-determining receiver is adapted to estimate position data for guiding the material-transferring vehicle. An image sensor is mounted on the material-transferring vehicle or the first storage container for estimating a lateral separation distance between the first storage container and the material-receiving vehicle for receiving the material. An electronic data processing system guides the material-transferring vehicle based on the estimated position data and the estimated lateral separation distance, to maintain a generally constant target lateral separation distance between the material-transferring vehicle and the material-receiving vehicle during the transfer of the material.

18 Claims, 4 Drawing Sheets

(56) References Cited

U.S. PATENT DOCUMENTS

| | | |
|---|---|---|
| 7,507,917 B2 | 3/2009 | Kaltenheuser |
| 7,756,719 B2 | 7/2010 | Beck et al. |
| 7,761,334 B2 | 7/2010 | Pickett et al. |
| 7,852,462 B2 | 12/2010 | Breed et al. |
| 2002/0193928 A1* | 12/2002 | Beck ............................... 701/50 |
| 2007/0005208 A1* | 1/2007 | Han et al. ...................... 701/50 |
| 2009/0099775 A1 | 4/2009 | Mott et al. |
| 2009/0216410 A1* | 8/2009 | Allen et al. ..................... 701/50 |
| 2009/0325658 A1 | 12/2009 | Phelan et al. |
| 2010/0066517 A1 | 3/2010 | Posselius et al. |
| 2010/0206642 A1* | 8/2010 | Curotto ............................. 177/1 |
| 2010/0332051 A1 | 12/2010 | Kormann |
| 2011/0066337 A1 | 3/2011 | Kormann |
| 2011/0205084 A1* | 8/2011 | Morselli .............. A01D 43/086 340/901 |

FOREIGN PATENT DOCUMENTS

| | | |
|---|---|---|
| EP | 2161589 | 3/2010 |
| EP | 2165586 | 3/2010 |
| EP | 2165590 | 3/2010 |
| EP | 2245916 | 11/2010 |

* cited by examiner

SYSTEM FOR AUTOMATED UNLOADING OF AN AGRICULTURAL MATERIAL

FIELD OF THE INVENTION

This invention relates to a system for automated unloading of an agricultural material.

BACKGROUND OF THE INVENTION

A cart, wagon or other vehicle may hold harvested agricultural material (e.g., grain) until it is unloaded or transferred to a truck for transportation from a farm. In some prior art, certain carts or wagons have integral augers and unloading chutes to facilitate the transfer of the harvested agricultural material to the truck. If the driver fails to maintain proper alignment between the cart and truck, an unwanted collision between the unloading chute and the truck may occur, which can lead to inopportune down-time of the equipment in the midst of harvest season. Thus, there is a need for a system for automated unloading of agricultural material that minimizes unwanted collisions, among other things.

SUMMARY OF THE INVENTION

In one embodiment, a system manages the transfer of agricultural material from a material-transferring vehicle to a material-receiving vehicle. An unloading chute extends above or from a side of a first storage container of the material-transferring vehicle. The unloading chute is adapted to transfer material from the first storage container to a material-receiving vehicle alongside the material-transferring vehicle. A location-determining receiver is adapted to estimate position data for guiding the material-transferring vehicle. An image sensor is mounted on the material-transferring vehicle or the first storage container for estimating a lateral separation distance between the material-transferring vehicle and the material-receiving vehicle. An electronic data processing system guides the movement and position of material-transferring vehicle based on the estimated position data and the estimated lateral separation distance, where the estimated lateral separation distance of the image sensor supersedes or augments the estimated position data for the material-transferring vehicle to maintain at least a minimum target lateral separation distance between the material-transferring vehicle and material-receiving vehicle prior to, during, and after the transfer of the agricultural material.

DESCRIPTION OF THE PREFERRED EMBODIMENT

Figure 1:
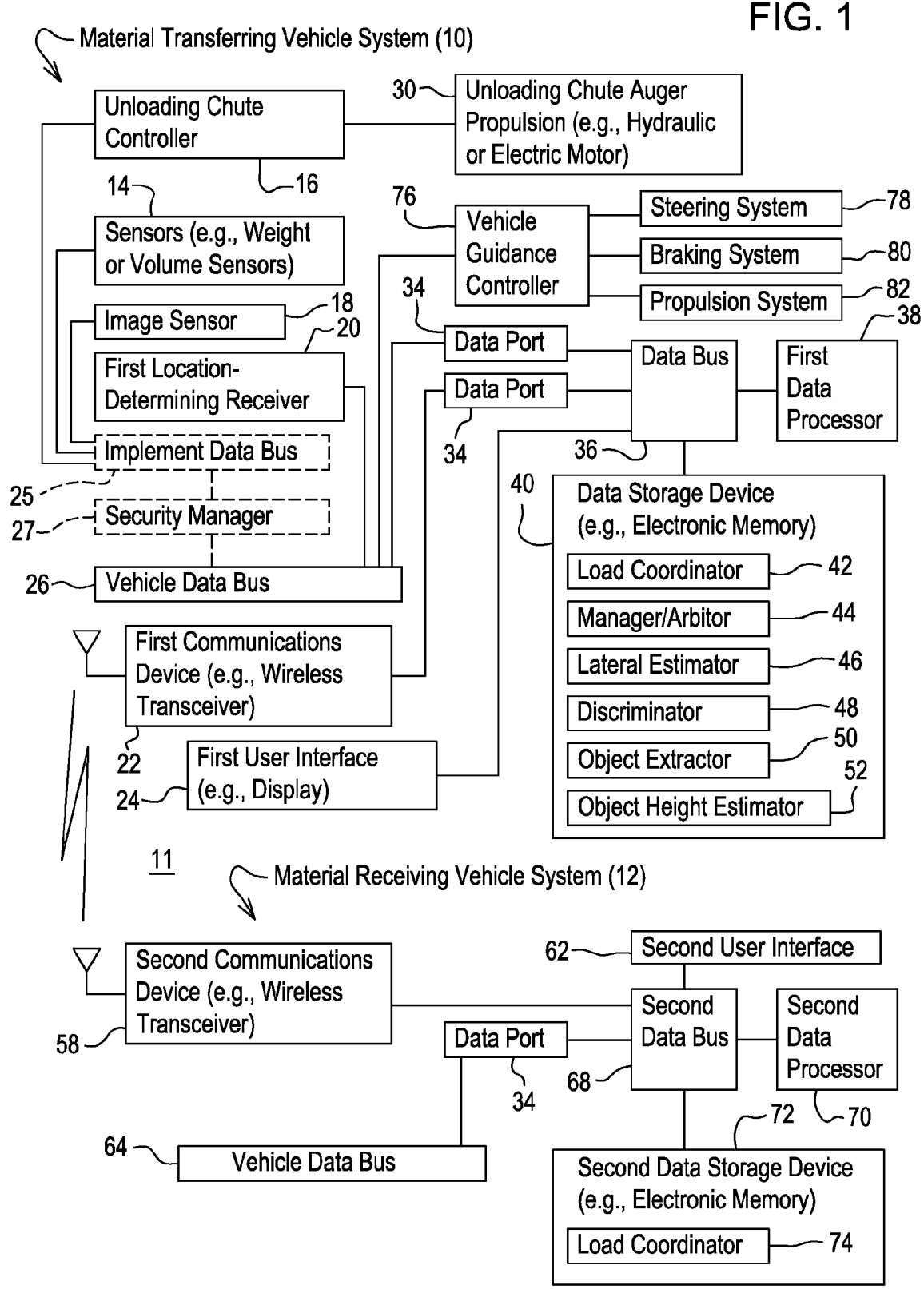
FIG. 1 illustrates a block diagram of one embodiment of a system for automated unloading of an agricultural material.

In accordance with one embodiment, FIG. 1 illustrates a block diagram of a system 11 for managing the transfer of agricultural material from a material-transferring vehicle to a material-receiving vehicle. For example, the system 11 comprises an electronic data processing system, such as a computer programmed with software instructions or software modules to manage the alignment of a material-transferring vehicle and a material-receiving vehicle. The agricultural material may comprise grain, corn, maize, soybeans, oilseed, fiber, vegetables, fruit, nuts, seeds, or another harvested crop. The material-transferring vehicle has a material-transferring vehicle system 10. The material-receiving vehicle has a material receiving-vehicle system 12.

In FIG. 1, the lines interconnecting the components of the material-transferring vehicle system 10 or the material-receiving vehicle system 12 may comprise physical data paths, logical data paths, or both. Physical data paths comprise one or more data buses, conductors, wires, transmission lines, wireless links, or traces of a circuit board, for example. Logical data paths comprise the communication of data via software or software modules.

Figure 3:
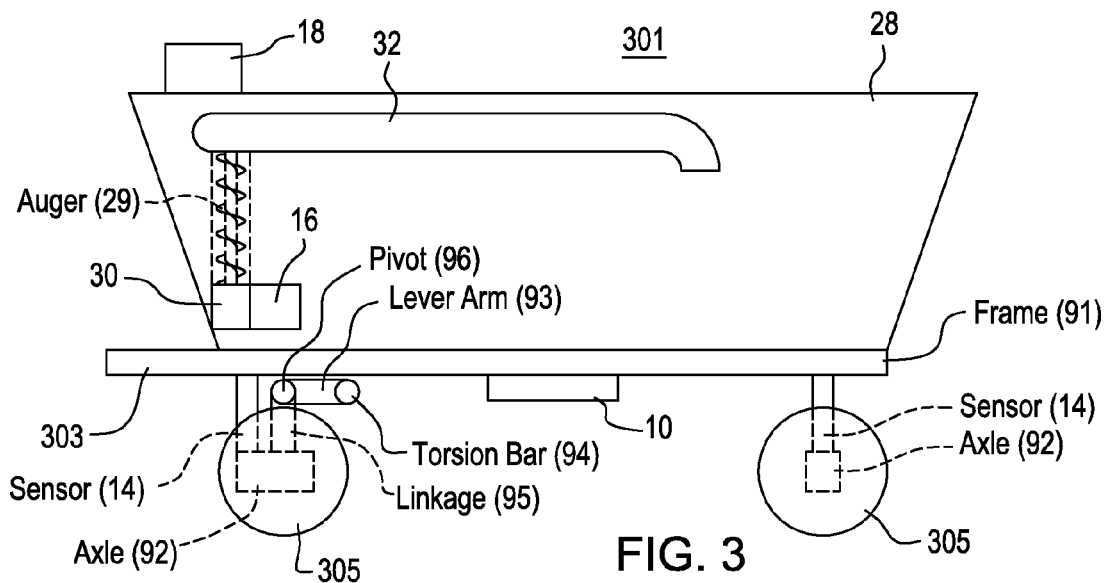
FIG. 3 is a side view of one possible configuration of a material-transferring vehicle, consistent with the system of the disclosure.

As illustrated in FIG. 1 and FIG. 3, the material-transferring vehicle (301 in FIG. 3) comprises a first storage container 28, an auger 29, an unloading chute controller 16, an unloading chute auger propulsion unit 30, and an unloading chute 32 for unloading the first storage container 28. The first storage container 28 is supported by a frame 91 of the material-transferring vehicle 301, which is associated with two or more rotatable wheels 305 for engaging the ground. The unloading chute auger propulsion unit 30 drives the auger 29 for moving or conveying material through the unloading chute 32. The unloading chute controller 16 controls one or more of the following: (1) the rotation, direction of rotation, torque, torque slip, or duty cycle of the auger 29, (2) the rate of rotation of the auger 29 or the auger propulsion unit 30, (3) an active state ("on state") or inactive state ("off state") of the auger propulsion unit 30, and (4) the angular position of the unloading chute 32 with respect to the vehicle 401, or its side, where the angular position is controlled by a servo-motor and an angular position sensor connected to the unloading chute controller 16.

Figure 5:
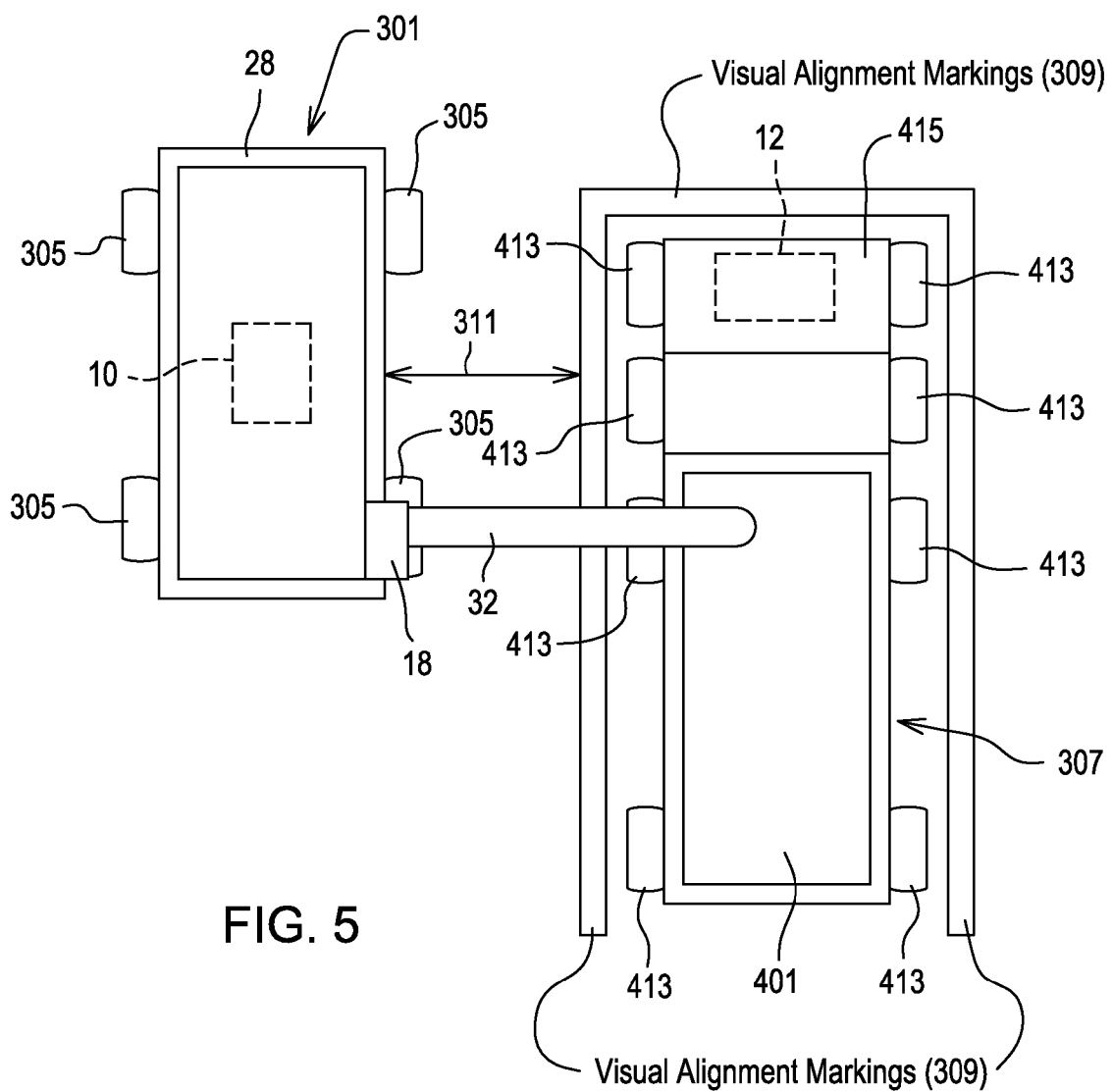
FIG. 5 shows the material-transferring vehicle aligned with the material-receiving vehicle for the transfer of an agricultural product, where the material-receiving vehicle is in a fixed stationary position defined by one or more visible markings on the ground or around a periphery of the material-receiving vehicle.

As illustrated in FIG. 5, during a loading process, an unloading chute 32 extends (e.g., generally orthogonally) above or from a side of a first storage container 28 of the material-transferring vehicle 301. The unloading chute 32 is adapted to transfer material from the first storage container 28 to a second storage container 401 of a material-receiving vehicle (307 in FIG. 5) alongside the material-transferring vehicle (301 in FIG. 3 and FIG. 5).

In FIG. 1, a first location-determining receiver 20 is adapted to estimate position data for guiding the material-transferring vehicle 301. An image sensor 18 is mounted on the material-transferring vehicle 301 or the first storage container 28 for estimating a lateral separation distance (e.g., 311 in FIG. 5) between the material-transferring vehicle 301 and the material-receiving vehicle 307 for receiving the agricultural material. An electronic data processing system 10 guides the material-transferring vehicle 301 based on the estimated position data and the estimated lateral separation distance, where the estimated lateral separation distance of the image sensor 18 supersedes or augments the estimated position data for the material-transferring vehicle 301 to maintain at least a minimum target lateral separation distance 301 between the material-transferring vehicle 307 and material-receiving vehicle during the transfer of the material.

The lateral separation distance may be defined in accordance with various definitions that may be applied alternately or cumulatively, or depending upon the relative position of the vehicles (301, 307). Under a first definition, the lateral separation distance 301 may represent the closest linear distance between a reference point on the material-transferring vehicle 301 to the corresponding reference point on the material-receiving vehicle 307. Under the first definition, the material-transferring vehicle 301 and the material-receiving vehicle 307 do not need to be in a side-by-side positional relationship. Under a second definition, the lateral separation distance may represent the linear distance between a reference point on the material-transferring vehicle 301 to the corresponding reference point on the material-receiving vehicle 307, where the linear distance is normal to or generally orthogonal to a side of the material-transferring vehicle 301 facing a side of the material-receiving vehicle 307.

In FIG. 1, the material-transferring vehicle system 10 comprises sensors 14 (e.g., mass, weight or volume sensor 14), an unloading chute controller 16, and an image sensor 18 that are coupled to a vehicle data bus 36, either directly or through an optional implement data bus 25 and an optional security manager 27. The optional implement data bus 25 and security manager 27 are shown in dashed lines.

In one illustrative embodiment, the sensors 14, unloading chute controller 16, and image sensor 18, and the implement data bus 25 reside on a wagon, cart, or other mobile storage portion (e.g., first container 18) of the material-transferring vehicle 301, whereas the other elements of the material-transferring vehicle system 10 illustrated in FIG. 1 reside on a tractor or propelled vehicle portion (not shown) for pulling or pushing the wagon, cart, or mobile storage portion. As illustrated in FIG. 3, a tractor or propulsion vehicle portion may be mechanically coupled to the hitch assembly 303 for pulling the wage, cart or mobile storage portion of the material-transferring vehicle 301. The hitch assembly 303 may also support wiring harnesses or wireless link to facilitate one or more physical data paths necessary to carry out the material transferring system 10.

In one configuration, the security manager 27 comprises one or more of the following: an interface, bridge or gateway between data buses, shared or common memory, buffer memory, a router, and a security device. The security manager 27 is programmed or configured to block access from the implement data bus 25 to the vehicle data bus 36, unless an appropriate security measure, such as a security key or encrypted data message generated based on the key is transmitted to and accepted by the security manager 27.

In one embodiment, the image sensor 18 comprises a camera, a stereo image sensor, or a monocular image sensor. In another embodiment, the image sensor 18 comprises one or more laser range finders spaced apart on the material-transferring vehicle, each laser range finder measurement device using time of flight of a pulse of infrared laser light, or detection of frequency or phase of modulated laser signal.

The image sensor 18 is configured to determine the lateral separation distance or the closest lateral separation distance between the material-transferring vehicle and the material receiving vehicle. The image sensor 18 may determine the lateral separation distance of the material receiving vehicle at one or more points on the material receiving vehicle with respect to one or more reference locations of the image sensor 18 on the material-transferring vehicle.

The first location determining receiver 20, one or more data ports 34, and a vehicle guidance controller 76 are coupled to the vehicle data bus 26. A first communications device 22 (e.g., wireless transceiver) is coupled to a data port 34, which is in turn connected to a data bus 36. Another data port 34 is coupled the vehicle data bus 36 to the data bus 26. The data port 34 may comprise one or more of the following: an input/output data port, buffer memory, shared or common memory, a data transceiver.

The first location determining receiver 20 may comprise a Global Positioning System (GPS) receiver, a GLONASS receiver (e.g., Russian equivalent of GPS), a global navigation satellite system (GNSS), or another satellite navigation receiver for estimating a location or position in coordinates (e.g., two dimensional or three dimensional coordinates).

The first data processor 38, one or more data ports 34, a first user interface 24, and a data storage device 40 are coupled to the data bus 36. The first data processor 38 may communicate with the data ports 34, the first user interface 24, and the data storage device 40 (or software modules stored therein) via the data bus 36. The data storage device 40 (e.g., electronic memory) may store software instructions or software modules for execution by the first data processor 38. For example, the data storage device 40 stores, retrieves or manages one or more of the following software modules: a load coordinator 42, a manager/arbiter 44, a lateral estimator 46, a discriminator 48, and object extractor 50, and an object height estimator 52.

The load coordinator 42 determines and records load data records that comprise one or more of the following: a first amount (e.g., volume, weight or bushels) of loaded agricultural material on the material transferring vehicle 301 or in the first container 28, a second amount of loaded agricultural material on the material receiving vehicle 307 or in the second container 401, a date of transfer of the loaded agricultural material onto or from any vehicle (301, 307) (e.g., with a vehicle identifier), a date of transfer of the loaded agricultural material from the material transferring vehicle 301 to the material receiving vehicle 307, a lot or lot identifier of the loaded agricultural material, oil content (e.g., average or mean) of the loaded agricultural material, moisture content (e.g., average or mean) of the loaded agricultural material, and a field or location identifier for the loaded agricultural material.

The lateral estimator 46 estimates the lateral separation distance (e.g., 311 in FIG. 5) between the material-transferring vehicle 301 and the material receiving vehicle 307 based on image data. For example, in one embodiment the lateral estimator 46 estimates the lateral separation distance from the image sensor 18, and image data processing (collectively or individually) by the discriminator 48, the object extractor 50 and object height extractor 50, for example.

Figure 4A:
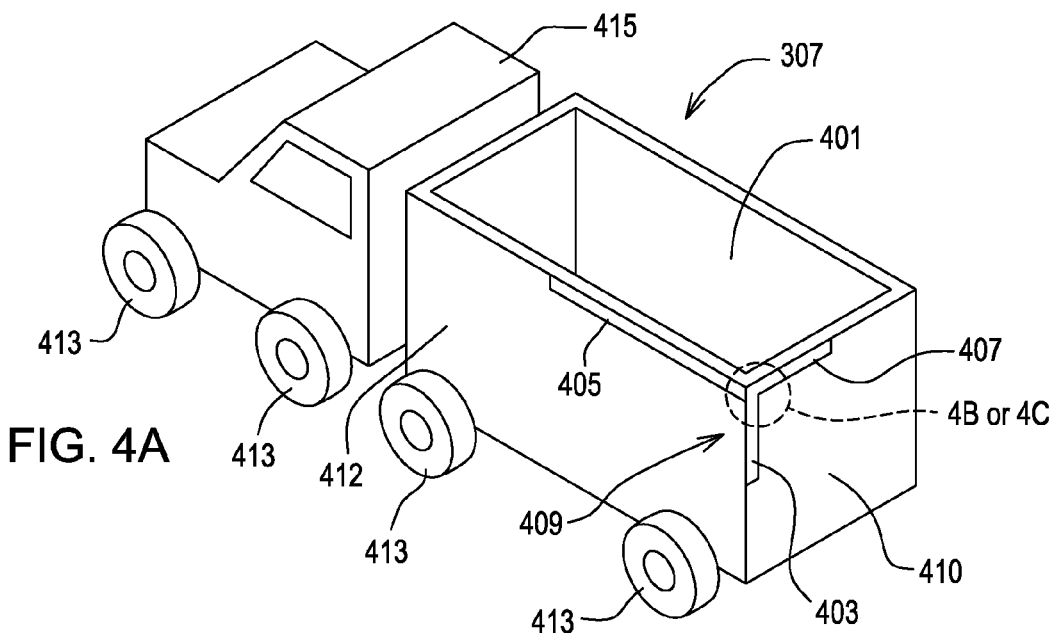
FIG. 4A is a perspective view of one possible configuration of a material-receiving vehicle consistent with one embodiment of the system of the disclosure.

The discriminator 48 facilitates identification of the reflective alignment pattern (e.g., 409 in FIG. 4A) from background image data (e.g., sides 410, 412 of the material receiving vehicle 307 in FIG. 4A) by color differentiation or pixel intensity data, where white or lighter pixels of the reflective alignment pattern tend to have greater pixel intensity or brightness than background pixels of a darker color, at least for those pixels associated with the material receiving vehicle 307. In one example, the discriminator 48 identifies the pixels within the reflective alignment pattern (409) by establishing a derivative image layer that overlays the original observed image data from the image sensor 18 and assigns a first digital value to the identified pixels within the alignment pattern and a second digital value, distinct from the first digital value, to all background pixels in the derivative image data or derivative image layer.

The object extractor 50 analyzes the derivative image data (or derivative image layer) from the discriminator 48 to identify a boundary or outline of the reflective alignment pattern 409 or other identified alignment pattern. The object extractor 50 may processing the image data by applying one or more of the following processes: (1) use pattern matching to identify generally linear patterns of the pixels or linear borders of the reflective alignment pattern, or (2) interpolate or integrate the derivative layer or identified alignment pattern to assign generally linear borders or boundaries to it. In one embodiment, the object extractor 50 may output a derivative outline image layer (or outline image data) that overlays the original observed image data and assigns a primary digital value to the identified outline pixels within the alignment pattern and a secondary digital value, distinct from the primary digital value, to all other pixels in the outline image layer or the outline image data.

The object height estimator 52 may estimate an image height or a real world height of a portion (e.g., a horizontal stripe) of the alignment pattern 409 (e.g., from the outline mage layer). The image height may be proportional to the real world height of the analyzed portion of the alignment pattern 409. The object height estimator 52 has reference heights for various separations (distances) of the image sensor 18 from the alignment pattern 409 because the alignment pattern 409 is of a known size and shape. From empirical tests, a calibration procedure, or factory-programmed settings, reference heights and corresponding separations, ranges or distances between the vehicles (301, 307) are stored in a data file, a look-up table, a chart, a database, a data record, or another data structure. The object height estimator 52 or the lateral estimator 46 can estimate the distance or lateral separation distance (e.g., 311 in FIG. 5) between the image sensor 18 and the alignment pattern 409.

The manager/arbiter 44 can determine whether or not to use the lateral separation distance determined by the lateral estimator 46 or the object height estimator 52 to override a lateral separation distance derived from an estimated location (e.g., two or three dimensional coordinates) of a first location-determining receiver 20 and a known or fixed location of the material receiving vehicle 307. The fixed location may be marked with alignment markings 309, as illustrated in FIG. 5 for example. The lateral estimator 46 or first data processor 38 may estimate or determine the lateral separation distance in accordance with one or more techniques, which may be applied separately or cumulatively. Under a first technique, the manager/arbiter 44 may have a default setting or logic processing to override the lateral separation distance derived from the location data of the first location-determining receiver 20 and the known or fixed location of the material receiving vehicle 307. The lateral separation distance of the lateral estimator 46 or the object height estimator 52 may be used to guide the material-transferring vehicle in a proper position with respect to the material receiving vehicle 307, to avoid collisions.

Under a second technique, if no current lateral separation distance is available from the lateral estimator 46 or the object height estimator 52, a lateral separation distance derived from a location of a first location-determining receiver 20 and a known or fixed location of the material receiving vehicle 307 controls and is used to guide the material-transferring vehicle 301.

Under a third technique, if the lateral estimator 46 indicates that a lateral separation distance is not reliable because of ambient lighting, ambient darkness, precipitation, fog, dust, or poor visibility for any other reason, a lateral separation distance derived from a location of a first location-determining receiver 20 and a known or fixed location of the material receiving vehicle 307 controls and is used to guide the material-transferring vehicle 301. The lateral estimator 46 may use a light calibration procedure (e.g., from image data extracted from the image sensor 18, a photo cell detector, a charged coupled device, or other optical or infrared sensors) to determine whether one or more spectral bands are within proper ranges (e.g., pixel brightness, pixel intensity, lumen level, or radiation level range) or mean ranges (e.g., within an acceptable standard deviation) for operation of the image processing and image sensor 18 to provide a reliable lateral separation estimate between the vehicles. The spectral bands may include visible light, ultraviolet radiation or infrared radiation observable by the image sensor 18.

A vehicle guidance controller 76 provides control data to one or more of the following via one or more physical data paths, one or more logical data paths, or both: a steering system 78, a braking system 80, and propulsion system 82. The vehicle guidance controller 76 may control the steering system 78, braking system 80, and propulsion system 82 to approach a stationary material receiving vehicle 307 in a known fixed location, while maintaining at least a minimum target separation (e.g., 311) based on position data from a first location determining receiver 20, augmented by lateral separation data provided by the image sensor 18 and lateral estimator 46 or the first data processor 38.

In one configuration, the steering system 78, braking system 80, and propulsion system 82 are associated with a tractor or a propulsion vehicle (e.g., propulsion vehicle portion of the material transferring vehicle 301) for moving and controlling the movement of the material-transferring vehicle 301, as directed manually by a human operator manning vehicle controls or a user interface, or as instructed automatically by the vehicle guidance controller 76. The steering system 78 may comprise an electro-hydraulic steering system, an electro-mechanical steering system, an electric motor steering system, or another electrically or electronically controllable steering device for controlling the heading of the vehicle 301. The braking system 80 may comprise an electro-hydraulic braking system, an electro-mechanical braking system, or another electrically or electronically controllable braking device for stopping or decelerating the vehicle 301. The propulsion system 82 may comprise an internal combustion engine and an engine controller (e.g., for controlling an air and fuel metering device), or an electric motor and motor controller, for propelling the vehicle 301.

In an unmanned or automated navigation mode, the vehicle guidance controller 76 provides steering command data, braking command data, and propulsion command data to the steering system 78, braking system 80, and propulsion system 82 to control the navigation, position, heading, velocity, acceleration of the material transferring vehicle, or its position and heading relative to the material receiving vehicle 307. For example, in response to the steering command data or manual input from a human operator, the steering system 78 is capable of executing or carrying out steering command data (e.g., steering angle versus time or yaw) to a tractor or another propulsion vehicle to control the heading, position and movement of the material-transferring vehicle 301.

The material receiving vehicle system 12 comprises a second data processor 70, a second data storage device 72, a data port 34, and a second communications device 58 (e.g., wireless transceiver), and a second user interface 62, that are coupled to a second data bus 68. The second data processor 70 may communicate with one or more of the following via the second data bus 68: the second data storage device 72, the data port 34, the second communications device 58 and the second user interface 62.

The material transferring vehicle system 10 and the material receiving vehicle system 12 have some similar elements or components. For example, the first user interface 24 and the second user interface 62 may each comprise a user interface that comprises one or more of the following: a display, a pointing device (e.g., electronic mouse), a keypad, a keyboard, a switch, or a console. The first communications device 22 and the second communications device 58 may each comprise one or more of the following: a wireless transceiver, a cellular radio, a GSM (Global System for Mobile Communications) communications device, a time division multiple access wireless device, a code division, multiple access communications device, an analog wireless communications device, a digital wireless communications device, a wireless radio, a transmitter, or a receiver.

In the data port 34 provides an interface, bridge or gateway between the second data bus 68 and the vehicle data bus 64. The data port 34 is coupled to the second data bus 68 and the vehicle data bus 64.

In one embodiment, a material-transferring vehicle system 10 comprises computer system, such as the first data processor 38 and load coordinator 42, for determining or estimating a first amount of agricultural material that is loaded onto the material-transferring vehicle 301 and a second amount of agricultural material that is transferred to one or more material receiving vehicles 307 (e.g., trucks). Further, the material-transferring system 10 supports wireless communication between the material-transferring vehicle system 10 and the material receiving vehicle system 12 of one or more of the following: the first amount of available agricultural material in the first container 28 of the material-transferring vehicle 301, a second amount of agricultural material loaded from the first container 28 to the second container 401 of the material receiving vehicle 307 (e.g., truck). Wireless communication between a documentation computer, such as a second data processor 70 and load coordinator 42, on the material receiving vehicle system 12 allows the operator to unload the proper amount to the second container 401, or an automated system of the unloading chute controller 16 and unloading chute auger propulsion unit 30 to unload a prescribed amount or target amount of agricultural material (e.g., in bushels, metric tons, weight, or volume). The material receiving vehicle system 12 would document and record the amount of agricultural material (e.g., grain) unloaded into the material receiving vehicle 12.

In one example, an operator in the tractor that pulls the material-transferring vehicle 301 can control the unloading operation by estimating the amount of agricultural material (e.g., grain) that has been loaded onto the truck based on the weight measurement from sensors 14 or integral scale in the material-transferring vehicle 301.

In one configuration, the material receiving vehicle system 12 (e.g., on the truck) facilitates loading of the material receiving vehicle 307 with up to maximum amount of weight that the material receiving vehicle 307 (e.g., the truck) can legally accommodate for compliance with applicable state, federal laws or regulations. The material receiving vehicle system 12 estimates the amount of agricultural material loaded onto the material receiving vehicle 307 during any previous, interrupted or current grain unloading operation. The first data processor 38 for the material-transferring vehicle 301 may be located in the tractor, or the material transferring vehicle 301. The second data processor 70 for the material receiving vehicle system 12 is located on the material receiving vehicle 307. The first data processor 38 and the second data processor 70 can communicate with each other via the first communications device 22 and the second communications device 58 to facilitate record keeping of loading operations, and providing instructions to ensure proper automated loading from the first container 28 of the material-transferring vehicle 301 into the second container 401 of the material receiving vehicle 307 with avoidance of collision of the unloading chute 32 of the material-transferring vehicle 301 with the material receiving vehicle.

In one embodiment, one or more image sensors 18 (e.g., vision sensors) are mounted on the material-transferring vehicle 301, the unloading chute 32, or its first container 28 to provide guidance data via the user interface for a user to guide the material-transferring vehicle 301 (e.g., via a tractor) to avoid hitting or contacting the edge of the material receiving vehicle 307 (e.g., truck) and keeping the unloading chute 32 generally aligned with the center of the second container 401, or otherwise aligned for even distribution of loading of the agricultural material into the second container 401. For example, the first user interface 24 may display an overhead visual representation of the relative position of the material-transferring vehicle 301 and the material receiving vehicle 307 in real time, or another visual representation that allows an operator to maintain a desired or target lateral separation between the vehicles (301, 307) for a loading operation.

In another embodiment, the vehicle guidance controller 76 automatically steers or guides the material-transferring vehicle 301 to maintain at least a minimum desired or target lateral separation between the material-transferring vehicle 301 and the material receiving vehicle. The vehicle guidance controller 76 steers the material-transferring vehicle 301 alongside the material receiving vehicle 307 as the material receiving vehicle 307 rests in a known stationary position for loading and unloading.

Figure 2:
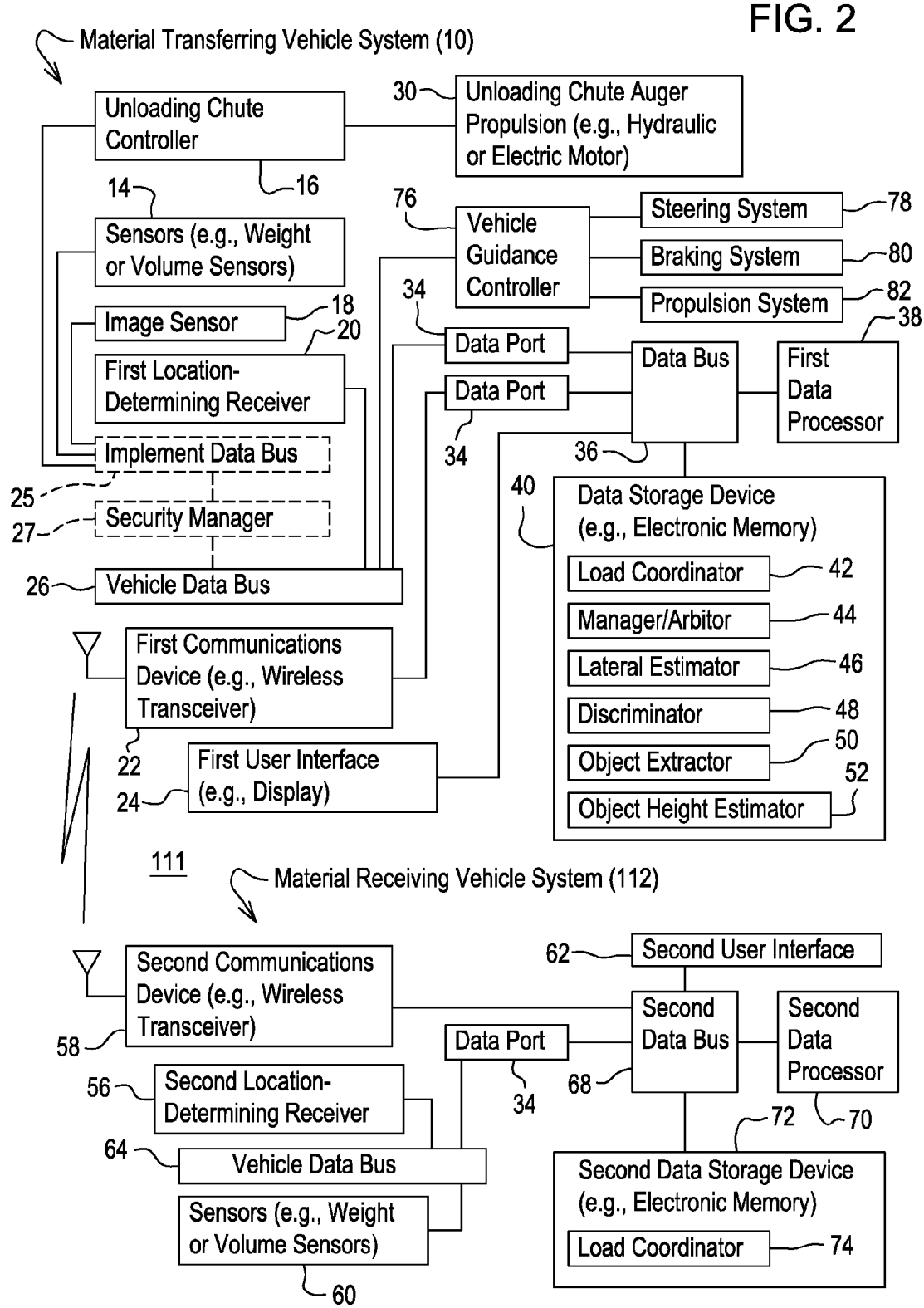
FIG. 2 illustrates a block diagram of another embodiment of a system for automated unloading of an agricultural material.

The system 111 of FIG. 2 is similar to the system 11 of FIG. 1, except the system 111 of FIG. 2 has a second location determining receiver 56 within the material receiving vehicle system 12. The system 111 of FIG. 2 is geared toward addressing loading operations, where the material receiving vehicle 307 is not parked or stationary in a known location, without assistance of the second location determining receiver 56. The second location determining receiver 56 may comprise a Global Positioning System (GPS) receiver, a GLONASS receiver (e.g., Russian equivalent of GPS), a global navigation satellite system (GNSS), or another satellite navigation receiver for estimating a location or position in coordinates (e.g., two dimensional or three dimensional coordinates).

In one configuration, the second location determining receiver 56 communicates its generally fixed position (e.g., in two or three dimensional coordinates) to the material-transferring vehicle system 10 so that the material-transferring vehicle system 10 can use both a first GPS position (e.g., first two dimensional or three dimensional coordinates) of the first location-determining receiver 20 and a second GPS position of a second location determining receiver 56 to align in the direction of travel alongside the material receiving vehicle 307 (e.g., truck). However, in the lateral dimension, the image sensor 18 and vision processing system and software would generally determine the alignment between the material-transferring vehicle 301 (e.g., mobile cart) and the material receiving vehicle 307 (e.g., stationary truck), unless the first data processor 38 finds the image data is not reliable, for instance.

FIG. 3 illustrates a material-transferring vehicle 301, cart or wagon for holding agricultural material or loading the agricultural material onto a material receiving vehicle 307 (in FIG. 5) or truck (e.g., on-road truck). Like reference numbers in FIG. 1, FIG. 2 and FIG. 3 indicate like elements.

The material-transferring vehicle 301 comprises a frame 91 a first container 28 that is secured or movably secured to the frame 91 via resilient members. One or more axles 92 or spindles may be attached to the frame 91 via suspension components, springs, torsion bars 94, or directly. Two or more wheels 305 are associated with the axle 92 or axles. Although the material-transferring vehicle 301 of FIG. 3 has four wheels 305, in an alternate embodiment which falls under the scope of the claims, the vehicle may have two wheels.

As shown in FIG. 3 for illustrative purposes, the front wheel and axle 92 is supported by an optional torsion bar assembly (93, 94, 95 and 96 collectively) that comprises a torsion bar 94 that is fixed to the frame 91 and can rotate with respect to the frame 91. The torsion bar 94 is placed under torque tension and is coupled to a lever arm 93. The lever arm 93 is mechanically coupled to the axle 92 via a linkage 95, where the lever arm 93 and linkage 95 are pivotable at a pivot 96 (e.g., bushing).

In an alternate embodiment, the torsion bar assembly (93, 94, 95 and 96 collectively) may be omitted from the material-transferring vehicle 301 and replaced by a direct connection of the axle 92 to the frame 91. As shown in FIG. 3 for illustrative purposes, the rear axle 92 is directly connected to the frame 91.

The sensors 14 may be mounted between the frame 91 and the axle 92 as shown in FIG. 3, between a bottom or floor of the first container 28 and top the frame 91, in the tongue or hitch assembly 303 of a two-wheeled material-transferring vehicle 301, integrated into the suspension of the material-transferring vehicle 301, or mounted elsewhere to measure the weight, mass or volume of agricultural material.

In FIG. 3, the sensors 14 may comprise weight sensors, such as load cells, a variable resistor, a displacement sensor, piezoresistive sensors, or piezoelectric sensors that are operable to detect the weight, mass or volume of agricultural material (e.g., grain, oil seeds, fiber) in the first container 28.

In an alternate embodiment, one or more optical sensors (e.g., photo cells and optical or infra-red transmitters) may be used to measure the level or levels of agricultural material in the first container 28.

Figure 4B:
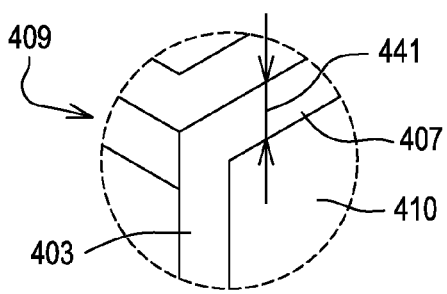
FIG. 4B shows an enlarged circular portion of FIG. 4A at a first distance.
Figure 4C:
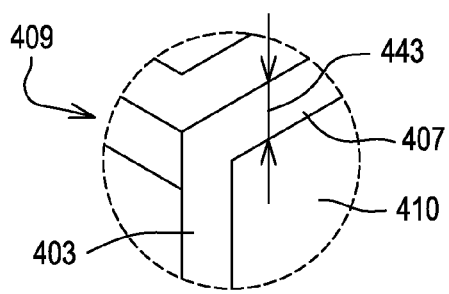
FIG. 4C shows an enlarged circular portion of FIG. 4A at a second distance, closer than the first distance.

In one embodiment, the image sensor 18 is configured to estimate or determine the lateral separation distance between the material-transferring vehicle 301 and the material receiving vehicle 307 by identification of a reflective alignment pattern (409 in FIG. 4A) on the material receiving vehicle 307 and estimation of the distance, range or lateral separation distance (311 in FIG. 5) between the material-transferring vehicle 301 and the material receiving vehicle 307 by vertical height (441 in FIG. 4B or 443 in FIG. 4C) of the reflective alignment pattern with respect to a reference vertical height at a known reference position stored in a data storage device 40. FIG. 4A, FIG. 4B and FIG. 4C provide an illustrative example of a reflective alignment pattern 409 on the material receiving vehicle 307.

In FIG. 4A, the material receiving vehicle 307 comprises a propulsion unit 415 or cab that pulls a second container 401 or trailer with wheels 413. The second container 401 has an open top, as illustrated, for the receipt of the agricultural material. The sides (410, 412) of the second container 401 are painted, marked or labeled with an alignment pattern 409.

In FIG. 4A, the alignment pattern 409 comprises a substantially linear lighter stripe 405 on a side of the material receiving vehicle 307 on a darker background color of the side 412. In a first example, the alignment pattern 409 may comprise one or more linear strips (405, 403, and 407) that intersect at a rear corner (e.g., upper rear corner) of the material receiving vehicle 307, for example. In a second example, the linear lighter strip (405, 403, 407) is white or whiter than the background color (of the sides) that surrounds or borders the strip. In a third example, the alignment pattern 409 comprises a plurality of linear stripes (405, 403, and 407) that intersect with and is contiguous with at least a back corner of the material-receiving vehicle 307.

In FIG. 4B and FIG. 4C, the horizontal strip 407 (or horizontal stripe) of the alignment pattern 409 has a first object height 441 and a second object height 443, respectively. The image sensor 18, first data processor 38, or the lateral estimator 46 estimates a first lateral separation distance (e.g., 311) between the vehicles (301 and 307) for the first object height 441 and a second lateral separation distance between the vehicles for the second object height 443. The first and second lateral separation distances may be measured at a normal or generally orthogonal angle to the material transferring vehicle 301. For example, the image sensor 18, first data processor 38, or the lateral estimator 46 estimates a closer lateral separation distance (311) between the vehicles (301 and 307) for the second object height 443 than the first object height 441 because the second object height 443 is greater than the first object height 441. The lateral estimator 46 or the object height estimator 52 is capable of estimating the lateral separation between the vehicles (301 and 307) as described in greater detail in this disclosure.

The material-receiving vehicle 307 is stationary in a location of known geographic coordinates, wherein the material-transferring vehicle 301 is configured to approach the known location with the stationary material receiving vehicle 307.

In one embodiment, the material-transferring vehicle comprises a first communications device 22 and the material receiving vehicle 307 comprises a second communications device 58 and a second location determining receiver 56. The second location-determining receiver is configured to estimate a receiving position of the material-receiving vehicle. A second communications device 58 is capable of transmitting the receiving position to the first communications device 22 and a first data processor 38.

Sensors 14 are configured to measure a weight or mass of agricultural material in a first storage container 28 of the material-transferring vehicle 301 to estimate the agricultural material transferred to the receiving vehicle 307. An unloading controller is capable of unloading a desired amount of agricultural material to the material-transferring vehicle 307 and stopping an unloading chute auger propulsion unit 30 when the desired amount of agricultural material is reached. In one embodiment, a second communications device 58 is capable of transmitting a data message indicative of the transfer of desired amount of agricultural material to the first communications device 22 to coordinate the delivery of the desired amount of agricultural material.

In FIG. 5, during a loading process, an unloading chute 32 extends above or from a side of a first storage container 28 of the material-transferring vehicle 301 toward the second storage container 401 of the material receiving vehicle 307. The unloading chute 32 is adapted to transfer material from the first storage container 28 to the second storage container 401 of the material-receiving vehicle 307 alongside the material-transferring vehicle 301. FIG. 5 provides a top or plan view of the material receiving vehicle 307, whereas FIG. 4A provides a perspective view of the material receiving vehicle 307. Like reference numbers in FIG. 5, FIG. 1 and FIG. 4A indicate like elements.

The material receiving vehicle 307 is parked or positioned in a known stationary position, which is defined by two or more visual alignment markings 309 (e.g., generally linear markings placed on the ground). For example, the visual alignment markings 309 may comprise generally linear markings that are placed on the ground based on measurements from a surveying precision global satellite positioning system.

In one configuration, traceability of the agricultural material that is loaded onto the truck or material receiving vehicle 307 is provided by a vehicle identification number. The material receiving vehicle 307 has a vehicle identification number to track the particular lot of agricultural material (e.g., grain) going to the elevator, the amount of agricultural material, and which field and farm or source the agricultural material came from. If there is any other information that needs to augment the traceability or amount of agricultural material loaded onto the material receiving vehicle 307, that can be done with this system (10,12) as well. The amount of agricultural information can be used to calibrate scale or sensors 14 on the material-transferring vehicle 307 by comparison to a scale at a grain elevator, for example.

In one configuration, the operator may be able to do a manual override of the fill amount or total load of agricultural material deposited in the first container 28. For example, the first data processor 38 and auger of the material transferring vehicle 301 can be set to load some percentage (e.g., five percent (5%)) below a full load of agricultural material, and any deviation or additional amount of agricultural material has to be manually loaded. The manual override feature may be advantageous for situations where the second container 401 has a few bushels of available capacity left, and the operator wants to unload completely the agricultural material from the first container 28.

Another aspect of the disclosure is to load the second storage container 401 or the material receiving vehicle in a way that helps traction or road stability of the material receiving vehicle 307. For example, if the material receiving vehicle 307 (e.g., truck) is filled starting at the back, and an operator then wants to move the truck when it is partially full, the truck may not be able to get good traction, and it may be difficult to move the truck. Instead, the system (10,12) could load the truck starting over the drive axles first to ensure good traction if the truck needs to be moved.

The material-transferring vehicle system 10 may communicate supplemental information about the agricultural material (e.g., grain) to the material receiving system 12. Such supplemental information may comprise one or more of the following items: moisture, protein content, source, or other data of the load. The supplemental information might provide faster service and transfer of agricultural material to the grain elevator, such that the grain elevator can efficiently manage moisture levels within various bins. In one example, supplemental information is measured by sensors (e.g., moisture, spectroscopic, microwave sensors) on the combine, and it gets transferred from combine to a material transferring vehicle 301 (e.g., grain cart) and from the material transferring vehicle 301 to a material receiving vehicle 307 (e.g., truck).

The method and system of this disclosure is well suited for automation of the unloading agricultural material (e.g., grain, soybeans, oilseeds, or fiber) from a combine or cart into a truck to avoid collisions between a discharge chute 32 of the cart and the truck. Accordingly, the method and system minimizes downtime for repair of the discharge chute 32, the cart and truck from collisions that would otherwise slow down or impede the harvesting operation, while repair is undertaken.

The method and system of this disclosure is well suited for loading the truck properly so the aggregate weight is correct and the weight is also distributed evenly within the truck container.

Having described the preferred embodiment, it will become apparent that various modifications can be made without departing from the scope of the invention as defined in the accompanying claims.

The following is claimed:

1. A system for managing the transfer of material from a material-transferring vehicle to a material-receiving vehicle, the system comprising:
   a material-transferring vehicle comprising a first storage container;
   an unloading chute extending above or from a side of the first storage container, the unloading chute adapted to transfer material from the first storage container to a material-receiving vehicle alongside the material-transferring vehicle;
   a location-determining receiver adapted to estimate position data for guiding the material-transferring vehicle;
   an image sensor mounted on the material-transferring vehicle or the first storage container for providing observed image data to estimate a lateral separation distance, between the first storage container and the material-receiving vehicle for receiving the material, based on the observed image data of a reflective alignment pattern painted, marked or labeled on the receiving vehicle;
   a discriminator for identifying pixels within the reflective alignment pattern distinct from background pixels associated with the observed image data; and
   an electronic data processing system for guiding the vehicle and its associated material-transferring vehicle based on the estimated position data and the estimated lateral separation distance, the electronic data processing system comprising a manager to determine whether to use the estimated lateral separation distance, between the vehicles, derived from image data of the image sensor or derived from estimated position data of the location-determining receiver, where the estimated lateral separation distance of the image sensor supersedes or augments the estimated position data for the material-transferring vehicle to maintain at least a minimum target lateral separation distance between the material-transferring vehicle and material-receiving vehicle during the transfer of the material.

2. The system according to claim 1 wherein the image sensor comprises a camera, a stereo image sensor, or a monocular image sensor to determine the lateral separation distance between the material-transferring vehicle and the material receiving vehicle by identification of the reflective alignment pattern on the material receiving vehicle and estimation of the distance between the material transferring vehicle and the material receiving vehicle by vertical height of the reflective alignment pattern with respect to a reference vertical height at a known reference position.

3. The system according to claim 2 wherein the alignment pattern comprises a substantially linear lighter stripe on a side of the vehicle on a darker background color.

4. The system according to claim 3 wherein the linear lighter strip is white or whiter than the background color.

5. The system according to claim 2 wherein the alignment pattern comprises a plurality of linear stripes that intersects with and is contiguous with at least a back corner of the material-receiving vehicle.

6. The system according to claim 1 wherein the mage sensor comprises one or more laser range finders spaced apart on the material-transferring vehicle, each laser range finder measurement device using time of flight of a pulse of infrared laser light, or detection of frequency or phase of modulated laser signal.

7. The system according to claim 1 wherein the material-receiving vehicle is stationary in a location of known geographic coordinates and wherein the material-transferring vehicle is configured to approach the known location with the stationary material receiving vehicle.

8. The system according to claim 1 wherein the material-transferring vehicle comprises:
a first communications device; and
wherein the material-receiving vehicle further comprises:
a second location-determining receiver for estimating a receiving position of the material-receiving vehicle;
a second communications device for transmitting the receiving position to the first communications device.

9. The system according to claim 1 wherein the transferring vehicle further comprises:
a plurality of sensors for measuring a mass of agricultural material in a storage container of the material-transferring vehicle to estimate the agricultural material transferred to the receiving vehicle;
an unloading controller for unloading a desired amount of agricultural material to the material-transferring vehicle and stopping an unloading chute auger propulsion unit when the desired amount of agricultural material is reached.

10. The system according to claim 9 wherein the material-transferring vehicle comprises:
a first communications device; and
wherein the material-receiving vehicle further comprises:
a second communications device for transmitting a data message indicative of the transfer of desired amount of agricultural material to the first communications device.

11. The system according to claim 1 wherein the discriminator identifies the pixels within the reflective alignment pattern by establishing a derivative image layer that overlays the original observed image data from the image sensor and assigns a first digital value to the identified pixels within the alignment pattern and a second digital value, distinct from the first digital value, to all background pixels in the derivative image data or derivative image layer.

12. The system according to claim 11 further comprising:
an object extractor to analyze the derivative image data from the discriminator to identify a boundary or outline of the reflective alignment pattern or other identified alignment pattern.

13. The system according to claim 1 wherein the alignment pattern comprises a plurality of linear stripes that intersect with each other.

14. The system according to claim 13 wherein the linear stripes are contiguous with at least a back corner of the material-receiving vehicle.

15. A system for managing the transfer of material from a material-transferring vehicle to a material-receiving vehicle, the system comprising:
a material-transferring vehicle comprising a first storage container;
an unloading chute extending above or from a side of the first storage container, the unloading chute adapted to transfer material from the first storage container to a material-receiving vehicle alongside the material-transferring vehicle;
a location-determining receiver adapted to estimate position data for guiding the material-transferring vehicle;
an image sensor mounted on the material-transferring vehicle or the first storage container for providing observed image data to estimate a lateral separation distance, between the first storage container and the material-receiving vehicle for receiving the material, based on the observed image data of a reflective alignment pattern painted, marked or labeled on the receiving vehicle;
a discriminator for identifying pixels within the reflective alignment pattern distinct from background pixels associated with the observed image data; and
an electronic data processing system for guiding the vehicle and its associated material-transferring vehicle based on the estimated position data and the estimated lateral separation distance, the electronic data processing system comprising a lateral estimator for determining the estimated lateral separation distance and a manager to determine whether to use the estimated lateral separation distance, between the vehicles, derived from the image data of the image sensor or derived from the estimated position data of the location-determining receiver, where, by a default setting of the manager, the estimated lateral separation distance of the image sensor supersedes or overrides the estimated position data of the location-determining receiver for the material-transferring vehicle to maintain at least a minimum target lateral separation distance between the material-transferring vehicle and material-receiving vehicle during the transfer of the material.

16. The system according to claim 15 wherein if no current lateral separation distance is available from the lateral estimator, a lateral separation distance derived from a location of a first location-determining receiver controls and is used to guide the material-transferring vehicle.

17. The system according to claim 15 wherein if a lateral separation distance is not reliable because of ambient lighting, ambient darkness, precipitation, fog, dust, or poor visibility for any other reason, a lateral separation distance derived from a location of a first location-determining receiver controls and is used to guide the material-transferring vehicle.

18. The system according to claim 17 wherein lateral estimator uses a light calibration procedure on image data extracted from the image sensor to determine whether one or more spectral bands are within proper ranges of pixel brightness, pixel intensity, lumen level, or radiation level range or mean ranges for operation of the image processing and the image sensor to provide a reliable lateral separation estimate between the vehicles.

\* \* \* \* \*